INVENTOR.
CHARLES W. KINSLEY

Fig. 4.

INVENTOR.
CHARLES W. KINSLEY
BY
Hood, Gust & Irish
Attorneys

INVENTOR.
CHARLES W. KINSLEY
BY Hood, Gust & Irish
Attorneys

July 4, 1967 C. W. KINSLEY 3,329,492
APPARATUS FOR FORMING HOLLOW GLASSWARE
Filed Feb. 12, 1964 10 Sheets-Sheet 7

INVENTOR.
CHARLES W. KINSLEY
BY Hood, Gust & Irish
Attorneys

United States Patent Office 3,329,492
Patented July 4, 1967

3,329,492
APPARATUS FOR FORMING HOLLOW
GLASSWARE
Charles W. Kinsley, Indianapolis, Ind., assignor to Glass
Machinery Inc., Indianapolis, Ind., a corporation of
Indiana
Filed Feb. 12, 1964, Ser. No. 344,311
7 Claims. (Cl. 65—223)

This invention relates generally to methods and apparatus for forming hollow glassware, and more particularly to a method and apparatus in which the glassware is partially formed in a parison pressing operation and completed in a blowing operation.

In a conventional form of glass machine referred to in the art as a "Hartford Empire IS machine," a parison is initially formed in a downwardly facing mold cavity of a two-part separable parison mold by the cooperation of an upwardly facing parison-forming plunger which is moved upwardly into the parison mold cavity. Following formation of the parison, the parison mold is opened, the plunger retracted, and the neck ring which supports the parison is inverted and transferred so as to position the parison within an upwardly facing cavity of a two-part separable blow mold. The blow mold is then closed and a sufficient delay provided prior to introduction of the blowing medium therein to permit the parison to reheat, since the relatively cool surfaces of the parison mold cavity and parison-forming plunger have cooled the surface areas of the parison forming crusts thereon and it is therefore necessary prior to blow-molding of the parison into its ultimate configuration to provide a sufficient delay to permit the latent heat of the interior of the parison to reheat the surface areas so as to provide a uniform temperature prior to the subsequent blowing operation. A plurality of sections each performing the above-described sequence of operations are conventionally assembled in parallel in a glass-forming machine of conventional design.

Such prior hollow glassware forming apparatus requires a complicated arrangement of actuators and linkages in order to effect the requisite motions and transfers; requires precise adjustments of the actuators and linkages, and its production capacity is restricted by inertial effects and the step of reheating the parison in the blow mold cavity prior to the blowing operation.

It is therefore desirable to provide a method and apparatus of the press and blow mold type for forming hollow glassware incorporating a system of actuators and linkages which is less complex than that heretofore provided, in which production capacity is increased by reduction of inertial effects and by removing the reheating cycle from the blow mold, and which will provide a more uniform quality of glassware in production.

It is also desirable that such apparatus employ readily available standard components and that it lend itself to ease of maintenance by relatively unskilled personnel. It is further desirable that the motions involved in such an apparatus shall be of such character as to facilitate the production, and the delivery to the blow mold, of a truly concentric parison, undistorted by centrifugal forces, whereby glass distribution, from the press to the finished piece, shall be greatly improved in uniformity as compared with the results of known procedures and mechanisms.

Still further, it is desirable that each individual container-forming apparatus shall be self-contained and identical with each other such apparatus in a bank, so that, in the event of break-down or for any other reason, any one such apparatus or module may be removed from the bank and replaced by an identical module.

It is accordingly an object of the invention to provide improved apparatus for forming hollow glassware.

Another object of the invention is to provide an improved method of forming hollow glassware.

A further object of the invention is to provide an improved method and apparatus of the press and blow mold type for forming hollow glassware, characterized by the simplification and reduction in the number of motions required and by the fact that the parison mold remains always upright, with a press plunger arranged above the upwardly-opening mouth of the parison mold.

A still further object of the invention is to provide improved apparatus of the press and blow mold type for forming hollow glassware which may be readily substituted for other apparatus in conventional glass forming machinery.

Further objects and advantages of the invention will become apparent by reference to the following description and the accompanying drawings, and the features of novelty which characterize the invention will be pointed out with particularity in the claims annexed to and forming a part of this specification.

The improved apparatus of the invention in accordance with its broader aspects comprises a one-piece parison mold having an upwardly facing mold cavity formed therein. Means are provided for selectively loading a charge of molten glass into the parison mold cavity and a parison-forming plunger is provided adapted to cooperate with the parison mold cavity to form the charge therein into a parison. The parison mold and plunger are selectively reciprocable on a vertical axis thereby to move the plunger into the parison mold cavity to form the parison therein. A separable blow mold is provided spaced from the axis of the plunger and parison mold and having an upwardly facing mold cavity formed therein. A neck ring is provided selectively movable between a first position on the axis of the plunger and parison mold and in registry therebetween and a second position in registry with the blow mold for transferring the parison from the parison mold to the blow mold.

The improved method of the invention in accordance with its broader aspects comprises the steps of forming a downwardly extending parison in a first position and holding the thus formed parison in its first position for a predetermined time thereby to reheat the parison. The parison is then positioned in a blow mold, and blowing medium is introduced into the blow mold thereby to blow-mold the parison. The completed glassware is then removed from the blow mold.

In the preferred embodiment of the invention, a new parison-forming cycle is initiated while the parison formed in the previous cycle is being blow molded in the blow mold.

Referring now to FIGS. 1 through 11 of the drawings, the improved apparatus of the invention, generally indicated at 20, is contained in or mounted upon a box frame 22 which may be suitably fabricated from steel plates, as by welding, and which has an upper bed or plate member 24. In a specific embodiment of the apparatus of the invention, the box frame 22 may have dimensions of approximately twenty-one inches high, thirty-six inches long and twenty-one inches wide to coincide with the standard dimensions of prior sections of a conventional "IS" glass machine, thus permitting reconstitution of such a machine by replacing its mechanism with a series of the modules disclosed herein.

Figure 1:
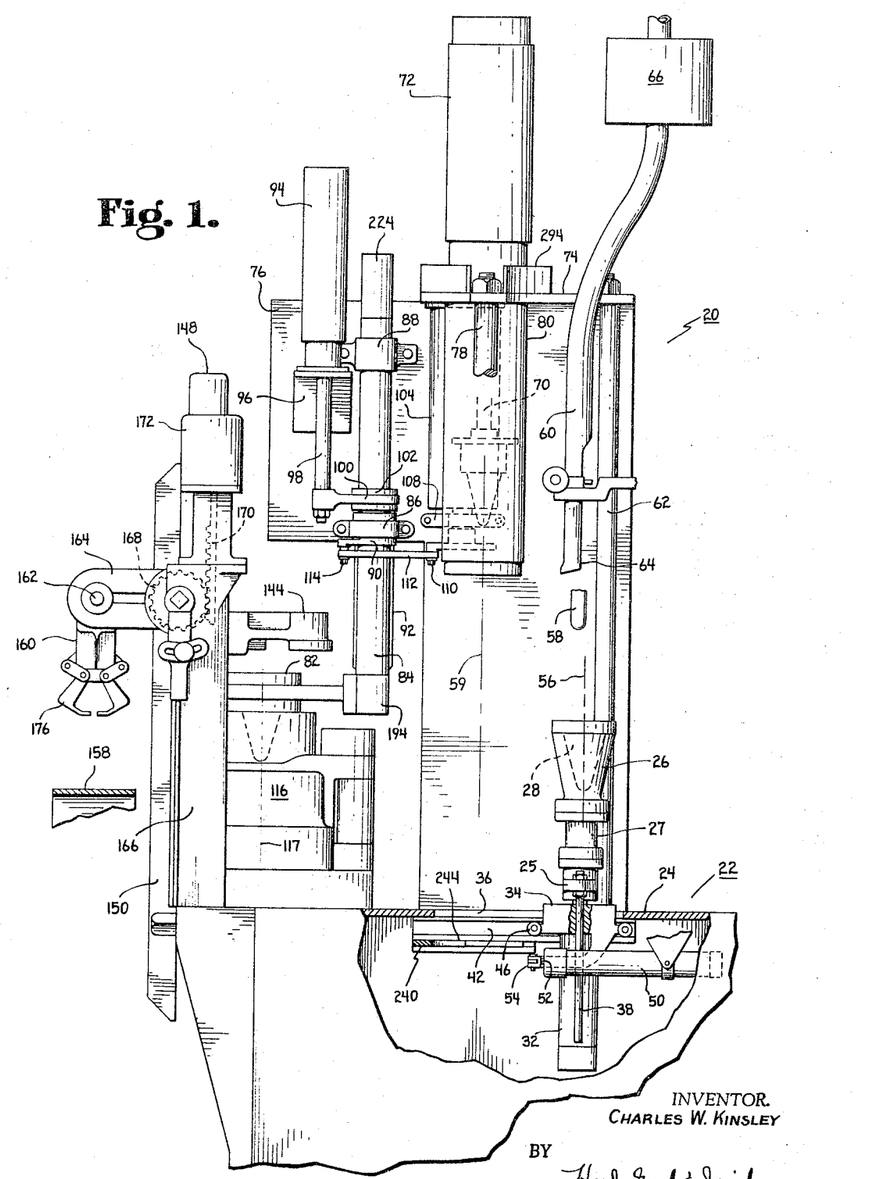
FIG. 1 is a side view, partly in cross-section and partly broken away, illustrating the improved hollow glassware forming apparatus of the invention with the components positioned for the first step in a new glassware forming cycle.
Figure 3:
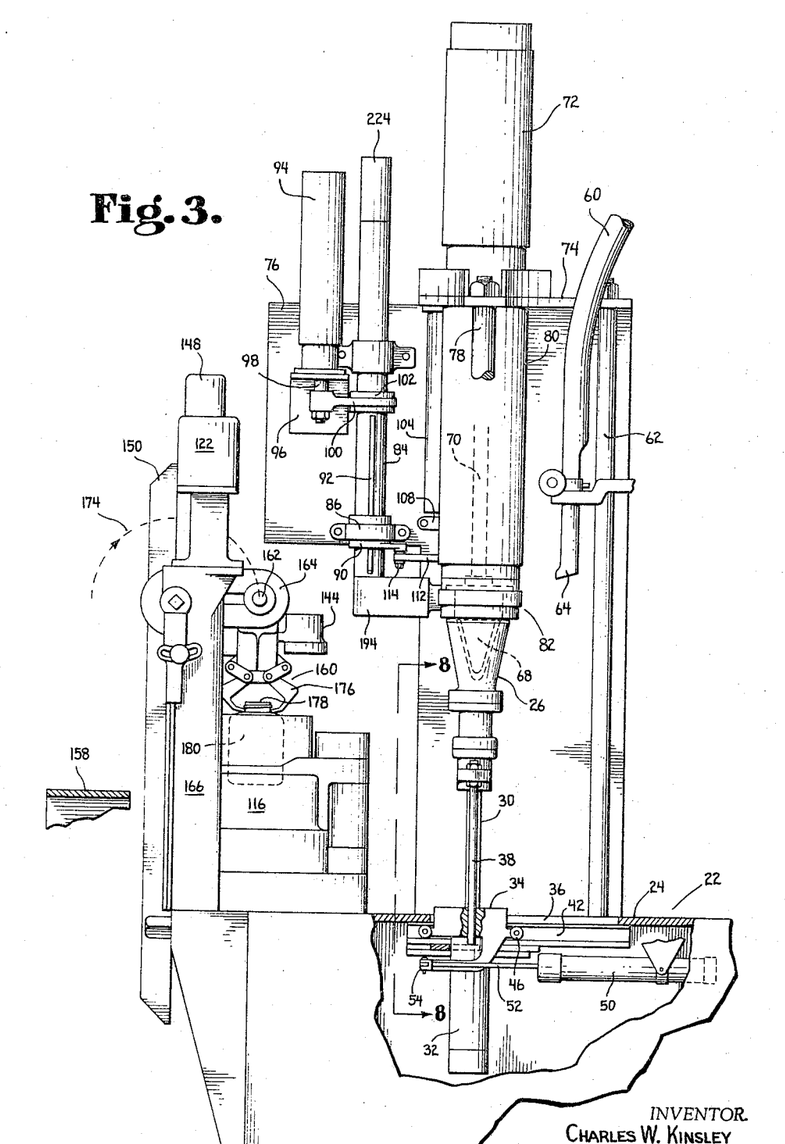
FIG. 3 is a view similar to FIG. 1 showing the components positioned for the third step.

A solid or one-piece parison mold 26 is provided having an upwardly facing parison mold cavity 28 formed therein mounted on a stool 27 which in turn is mounted on a yoke 25. Parison-mold 26 is thereby mounted upon the upper end of a vertically extending piston rod 30 (shown in FIG. 3) of a vertically disposed fluid power cylinder 32. All of the fluid power actuators of the apparatus of the invention are preferably of the pneumatic variety, but many alternatively be of the hydraulic type. It will thus be seen that the parison mold 26 is vertically reciprocable between a lower position as shown in FIG. 1 and an upper position as shown in FIG. 3 in response to selective actuation of the fluid power cylinder 32.

Fluid power cylinder 32 is mounted on and depends from a suitable carrier 34 which extends upwardly through an elongated opening or slot 36 formed through the upper plate member 24 of the box frame member 22. A pair of rigid guide rods 38, 40 (shown in FIGS. 1, 8 and 9) are secured to parison-mold yoke 25 and respectively extend downwardly therefrom on either side of and parallel with piston rod 30. Guide rods 38, 40 respectively extend downwardly through suitable openings (not shown) in the carrier 34 for guiding the vertical movement of the parison mold 26; and also for locking the parison mold in its elevated position, as will hereinafter be more fully described.

Figure 2:
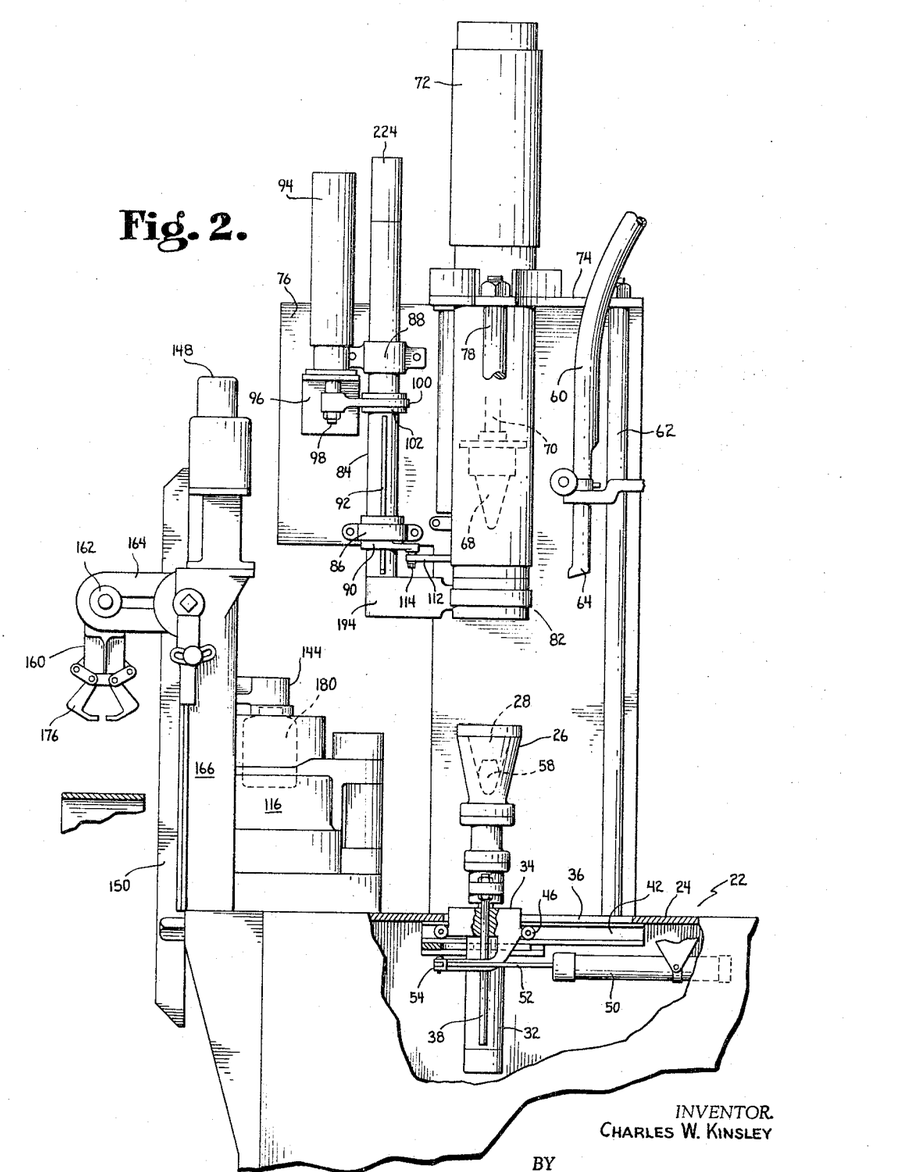
FIG. 2 is a view similar to FIG. 1 showing the components positioned for the second step in the cycle.
Figure 4:
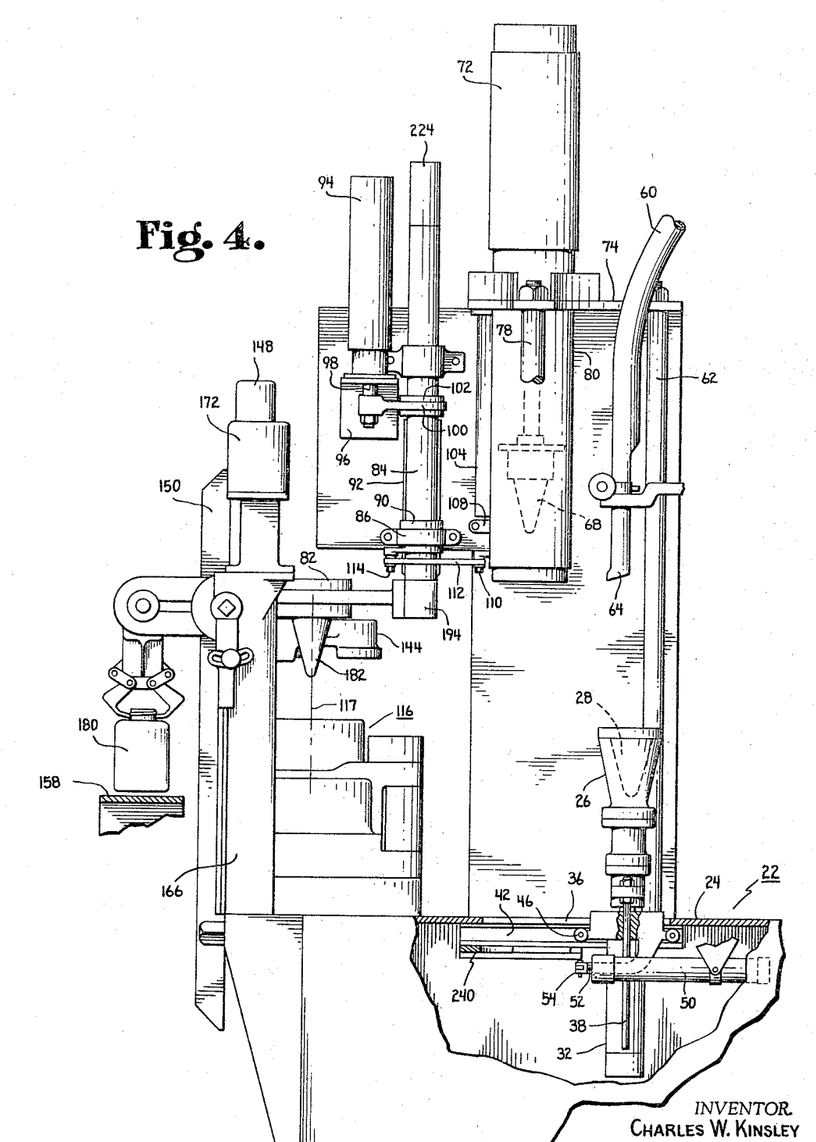
FIG. 4 is a view similar to FIG. 1 showing the components positioned for the fourth step.
Figures 8, 10:
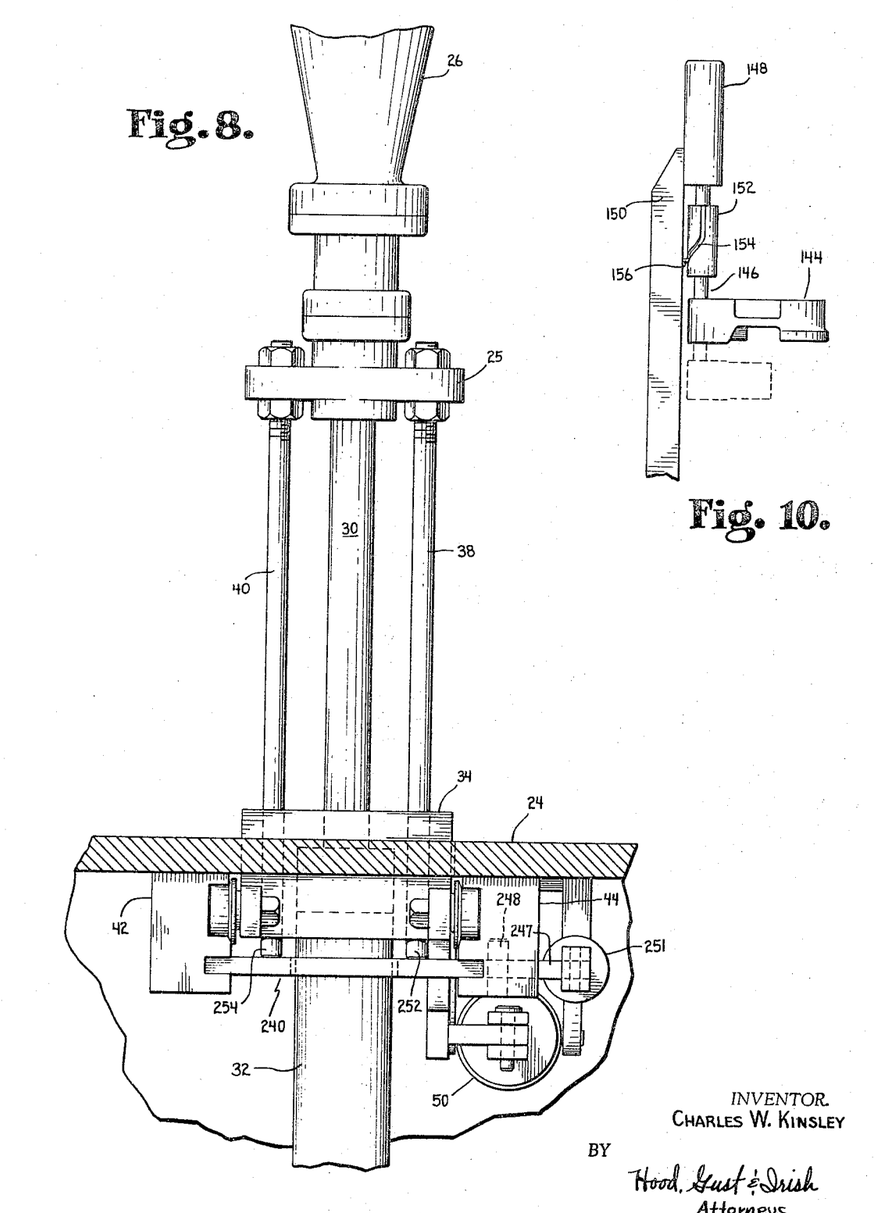
FIG. 8 is a fragmentary cross-sectional view taken along the line 8—8 of FIG. 3.
FIG. 10 is a fragmentary side view taken along the line 9—9 of FIG. 5.
Figure 11:
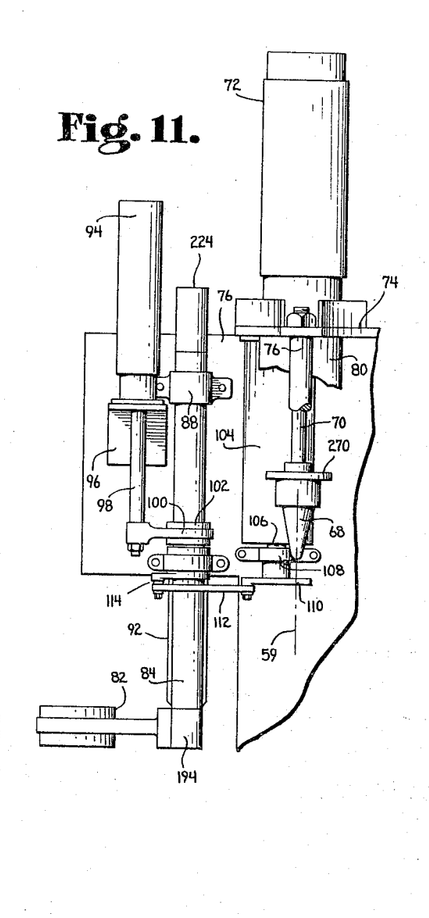
FIG. 11 is a fragmentary view similar to FIG. 1 but further broken away to illustrate the relationship of the components.

A pair of guide rails 42, 44 are respectively secured on the under side of plate member 24 on either side of the elongated opening 36 and parallel therewith. Rollers 46, 48 are respectively secured to the carrier 34 and supported on the guide rails 42, 44, as best seen in FIG. 8. A horizontally disposed fluid power cylinder 50 (shown in FIGS. 1, 2, 3 and 4) is mounted on the under side of plate member 24 and has a horizontally extending piston rod 52 with its distal end 54 connected to the carrier 34. It will thus be seen that the parison mold 26, carrier 34, and the above-mentioned apparatus mounted on carrier 34 are horizontally reciprocable between a first or loading position having parison mold 26 and parison mold cavity 28 aligned with a first vertical axis 56, as shown in FIGS. 1 and 4, a second position having parison mold 26 and parison mold cavity 28 aligned with a second vertical axis 59, as shown in FIGS. 2 and 3.

In order to load or introduce the charge or gob 58 of molten glass into the parison mold cavity 28 in the loading position of parison mold 26, a molten glass conduit 60 is provided secured to vertically extending frame element 62 which in turn is mounted upon the box frame 22. Molten glass conduit 60 has its open lower end 64 spaced above parison mold cavity 28 on the loading axis 56 thereby to drop the charge 58 of molten glass by gravity into the parison mold cavity 28. A conventional molten glass valve 66 is provided in the molten glass conduit 60 for metering the charge 58 of molten glass.

Aligned on the axis 59 is a downwardly facing parison-forming plunger 68 mounted on the lower end of a vertically downwardly extending piston rod 70 of vertically disposed fluid power cylinder 72. Fluid power cylinder 72 is mounted on plate member 74 spaced above and parallel with plate member 24 of box frame 22 by vertical plate member 76 and vertical frame elements 62, 78. Piston rod 70 extends downwardly through a suitably opening (not shown) in the plate member 74. Parison-forming plunger 68 is thus vertically movable between an upper inactive position as shown in FIGS. 1, 2, 4 and 10, and a lower pressing position, as shown in FIG. 3, in which it forcefully extends into the parison mold cavity 28 when the parison mold 26 is in its upper or pressing position, thereby to form the charge 58 of molten glass therein into a parison. A sleeve member 80 depends from plate member 74 and surrounds parison-forming plunger 68 and piston rod 70 in the upper position thereof.

A separable neck ring assembly 82 is provided, to be hereinafter more fully described, mounted on the lower end of a vertical member 84. Vertical member 84 is journalled for both vertical and rotational movement by suitable bearings 86, 88 secured to the vertical plate member 76. The vertical movement of member 84 is guided by a suitable bushing 90 supported by bearing 86 and cooperating with suitable splines 92 on member 84. Vertical movement is imparted to the vertical member 84 and the neck ring assembly 82 by vertically disposed fluid power cylinder 94 mounted on plate member 76 by bracket 96. Piston rod 98 of fluid power cylinder 94 is connected to member 84 by bracket 100 and bearing 102 which accommodates the rotational motion of member 84.

Rotational motion is imparted to member 84 and the neck ring assembly 82 by means of a suitable fluid power device 104 mounted on plate member 76 generally behind sleeve 80; fluid power device 104 imparts rotary motion to its shaft 106 (FIG. 11) journalled in a suitable bearing 108 secured to plate member 76. Crank 110 is mounted on the lower end of shaft 106 of fluid power device 104 and is connected by a link 112 to crank 114 of bushing 90 which, as indicated, is rotatably mounted in bearing 86. Thus, rotational movement of shaft 106 of fluid power device 104 will, through crank 110, link 112 and crank 114, turn member 84 by means of splines 92 thereon, splines 92 also accommodating the vertical movement of member 84 provided by fluid power cylinder 94. Thus, selective actuation of fluid power device 104 will turn member 84 and neck ring assembly 82 from a first or pressing position concentric with axis 59 and engaging the lower end of sleeve 80 as shown in FIGS. 2 and 3, to a second position spaced above separable blow mold 116 and concentric with the axis 117 of its cavity 118 (FIGS. 13E, F, G and H), as shown in FIG. 4. Selective actuation of fluid power cylinder 94 will then move member 84 and neck ring assembly 82 vertically on axis 117 between its second position as shown in FIG. 4 and its third position engaging the upper surface of blow mold 116, as shown in FIG. 1.

Blow mold 116, which may be of conventional construction, is mounted on the upper surface of plate member 24 of the box frame 22 and comprises two separable parts 120, 122 (FIGS. 5 and 13) which mutually define the upwardly facing blow mold cavity 118. Blow mold parts 120, 122 are pivotally mounted on plate member 24, as at 124 and are respectively moved between their closed and opened positions by shafts 126 and linkages 130 (only one such shaft and linkage being shown) operated in a conventional manner by a reciprocating fluid motor (not shown) which brings the linkages to dead center positions when the mold is closed.

Figures 5, 6:
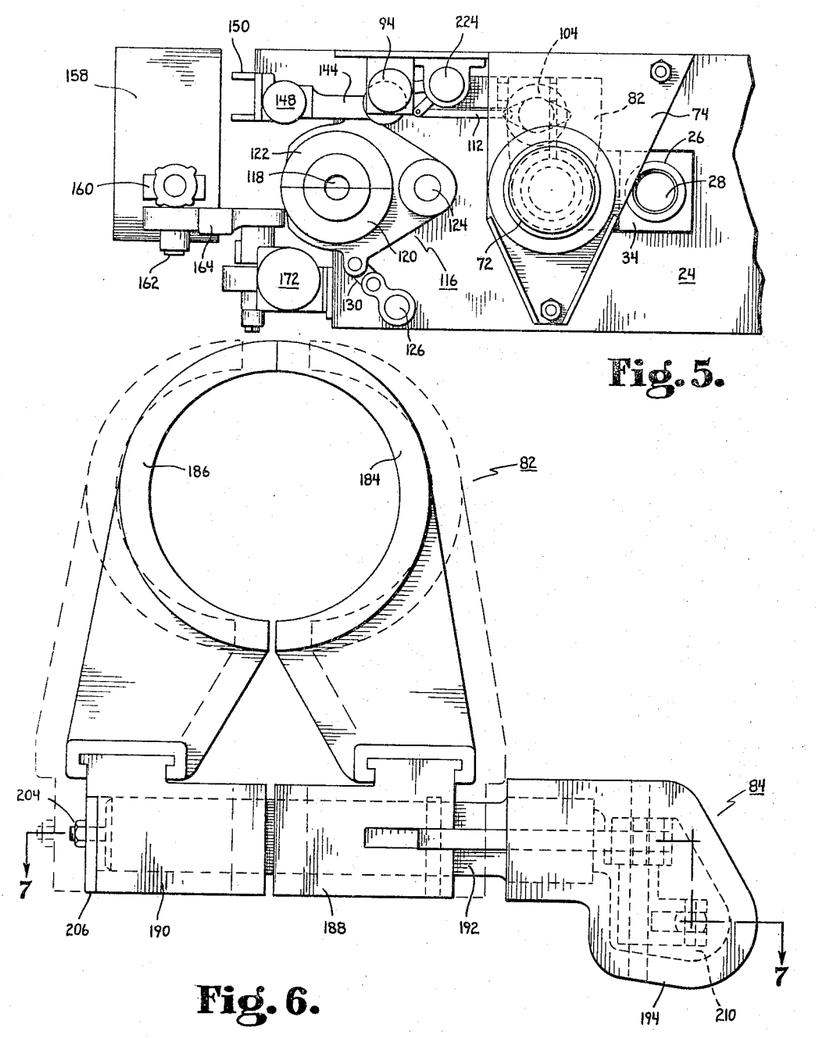
FIG. 5 is a top view of the apparatus of the invention.
FIG. 6 is a view showing details of the neck ring assembly.

When blow mold cavity 118 is closed, a suitable blowing medium, such as air, is introduced therein by means of a conventional blowing head 144. As best seen in FIG. 10, blowing head 144 is mounted on the lower end of vertically downwardly extending piston rod 146 of vertically disposed fluid power cylinder 148 which is mounted on a vertically upwardly extending frame element 150 secured to the box frame 22. Rotational movement is imparted to blowing head 144 simultaneously with its vertical movement by means of a sleeve 152 secured to piston rod 146 and having a groove 154 formed therein and proportioned to cooperate with pin 156 on frame element 150 to turn blowing head 144 from an inactive position out of registry with axis 117 and blow mold cavity 118, as shown in FIG. 5, into a position in registry with axis 117 and blow mold cavity 118 responsive to downward and upward movement of piston rod 146. Thus, selective actuation of fluid power cylinder 148 will move blowing head 144 between a first, inactive position out of registry with axis 117 and blow mold cavity 118, as shown in FIGS. 1, 3, 4, 5 and 10 and a second, lower blowing position in registry with axis 117 and closing blow mold cavity 118, as shown in FIG. 2.

The completed glassware is removed from the blow mold cavity 118 and placed on an unloading station 158 by a conventional fluid power-actuated take-out device 160. Take-out device 160 is pivotally mounted, as at 162, on member 164 which is rotatably mounted on vertically extending frame element 166 and secured to the box frame 22. A suitable gear 168 (FIG. 1) is secured to member 164 and cooperates with rack 170 mounted on the vertically downwardly extending piston rod of vertically disposed fluid power cylinder 172 mounted on frame element 166. Thus, selective actuation of the fluid power cylinder 172 will cause member 164 to rotate, as shown by the arrow 174 in FIG. 3, between its unloading position as shown in FIGS. 1, 2 and 4 with the take-out device 160 in registry with the unloading station 158, and its loading position as shown in FIG. 3 with the take-out device 160 in registry with blow mold cavity 118. A conventional fluid motor (not shown) is connected to close jaws 176 which are conventionally spring-biased to open position to actuate the take-out device 160, causing jaws 176 to engage neck 178 of the completed glassware 180 in the blow mold cavity 118 so that rotation of member 164 and device 160 back to its unloading position transfers the completed glassware 180 to the unloading station 158, as shown in FIG. 4 where release of the take-out device 160 will then deposit the completed glassware 180 upon the unloading station 158.

Figure 13A:
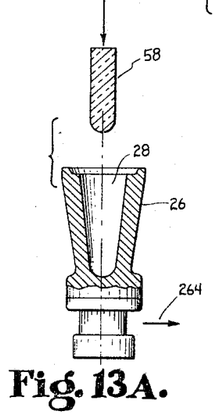
FIG. 13 is a diagram useful in explaining the method of the invention and showing the components of the apparatus in their several positions.
Figure 13B:
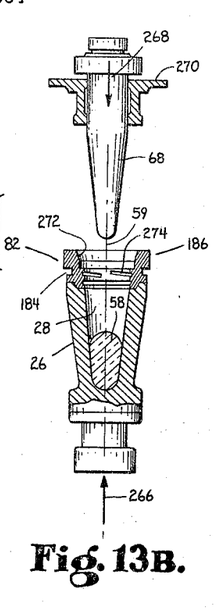
Figure 13C:
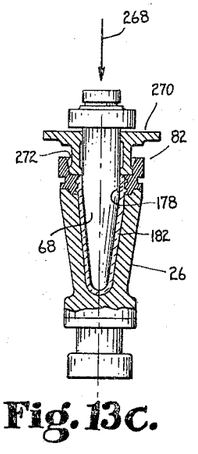
Figure 13D:
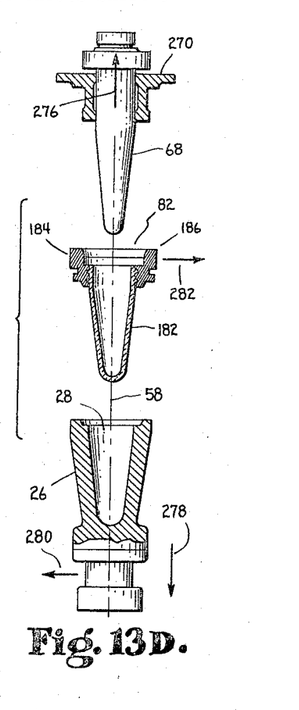
Figure 13E:
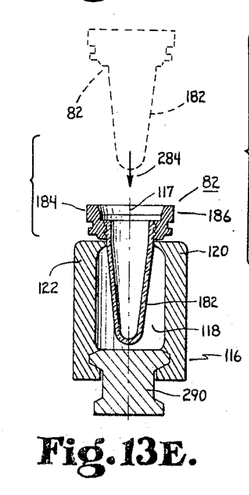
Figure 13F:
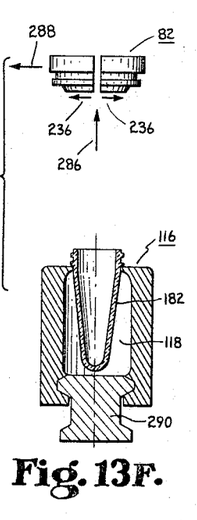
Figure 13G:
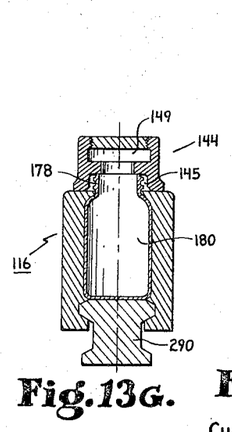
Figure 13H:
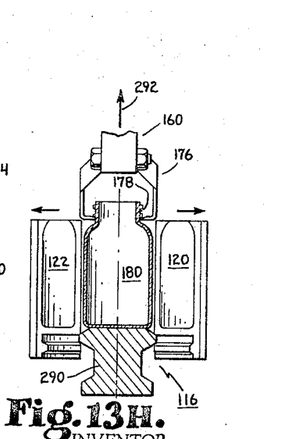
Figure 14A:
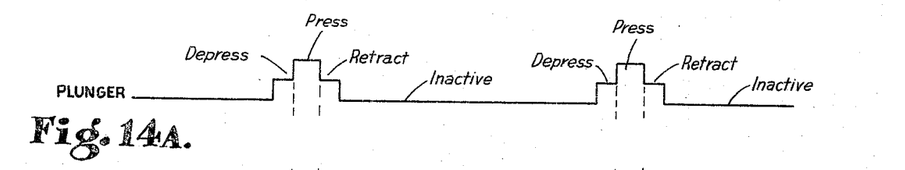
FIGS. 14A to 14F are diagrams showing the operational cycles of the components of the apparatus of the invention.
Figure 14B:
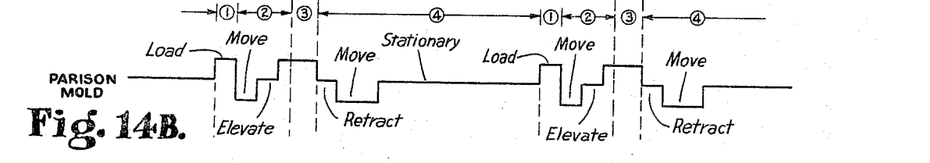
Figure 14C:
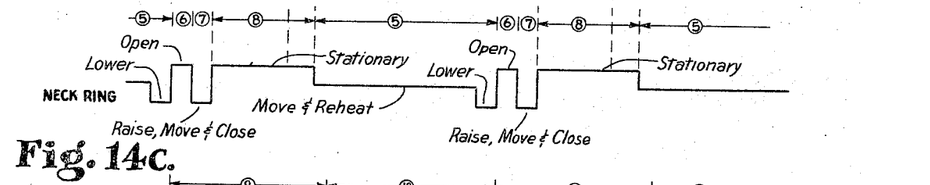
Figure 14D:
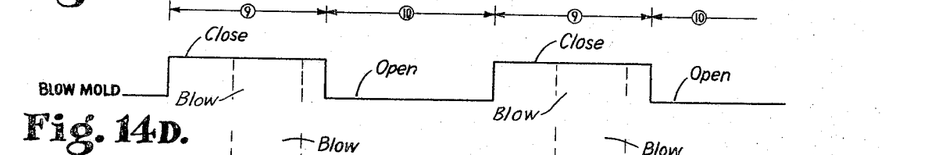
Figure 14E:
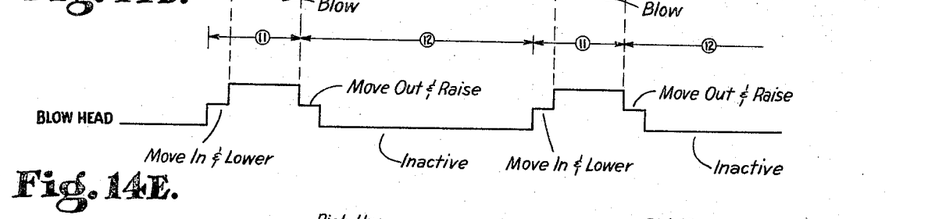
Figure 14F:
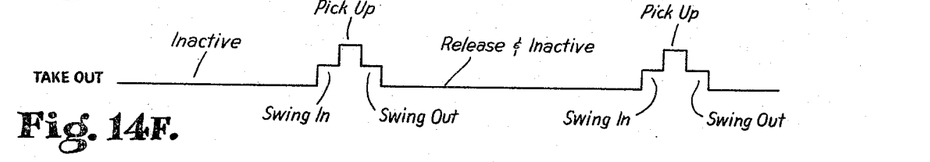

Referring particularly to FIG. 13G, blowing head 144 has a recess 145 formed in its lower surface which communicates with blow mold cavity 118 when the blowing head is in engagement with the upper surface of the blow mold 116 and which accommodates the neck 178 of the glassware 180 therein. The head 144 is formed to provide a cavity 149 therein, which in turn communicates with recess 145 and blow mold cavity 118. Through suitable passages, a source of blowing medium (not shown), such as compressed air, is connected to head 144 for introducing the blowing medium into the blow mold cavity 118 thereby to blow mold the parison 182 therein to form the completed glassware 180.

Figures 7, 9:
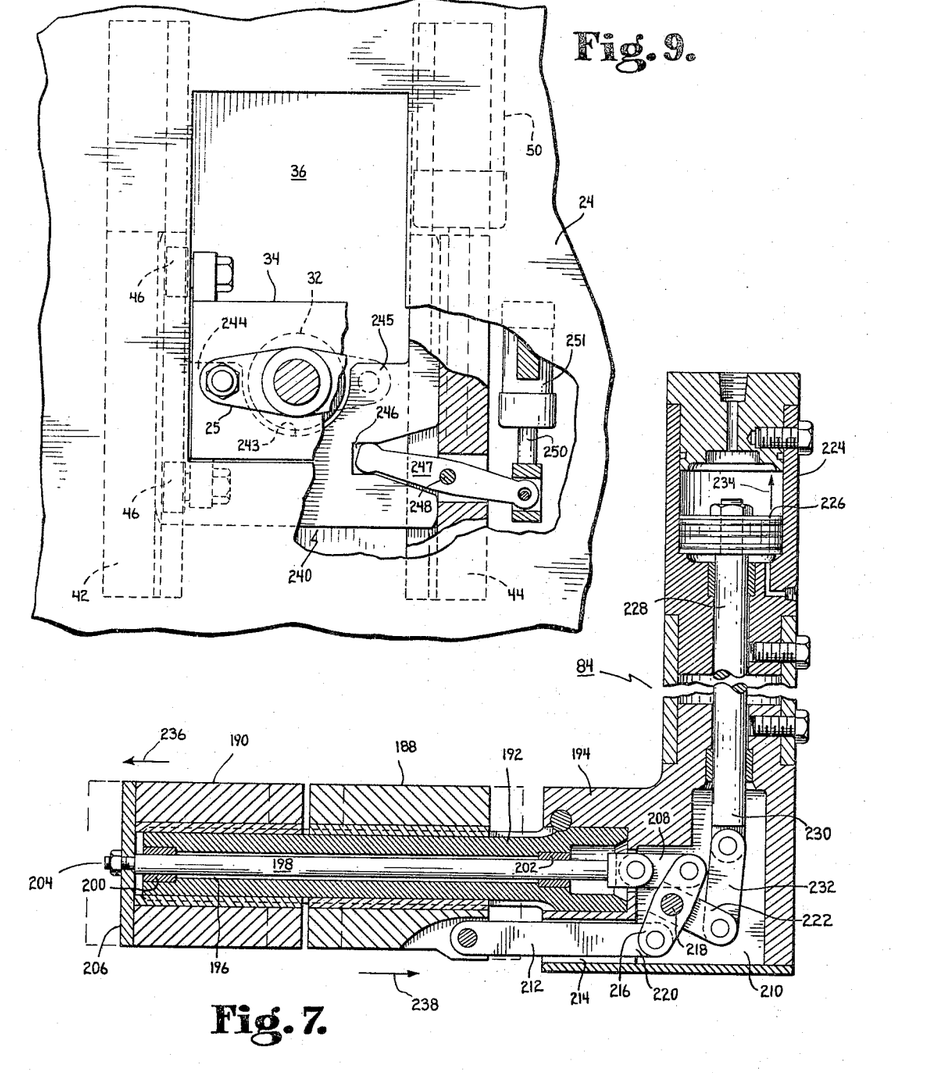
FIG. 7 is a cross-sectional view taken along the line 7—7 of FIG. 6.
FIG. 9 is a fragmentary, horizontal section, showing the yoke-supporting anvils and operating mechanism therefor.

Referring now particularly to FIGS. 6 and 7, neck ring 82 comprises two separable holders 184, 186 movable between a closed position as shown in solid lines in FIG. 6 and an open position as shown in dashed lines in FIG. 6. Neck ring holders 184, 186 are respectively secured to sleeve members 188, 190 which are slidably mounted on guide rod 192. Guide rod 192 extends outwardly from extension portion 194 at the lower end of vertical member 84. An axially extending opening 196 is formed in guide rod 192 through which an axially movable actuating rod 198 extends. Actuating rod 198 is supported within opening 196 for sliding axial movement by suitable bearings 200, 202. The distal end 204 of actuating rod 198 is secured to a plate member 206 which in turn is secured to sleeve member 190 to which neck ring holder 186 is attached. The other end 208 of actuating rod 198 extends into cavity 210 formed in extension portion 194 of member 84. Actuating link 212 is attached to sleeve member 188 to which neck ring holder 184 is secured. Link 212 extends through opening 214 in extension portion 194 and into cavity 210. Link 216 is pivotally mounted in cavity 210, as at 218 and has its two ends on the opposite sides of pivot 218 respectively pivotally connected to end 208 of actuating rod 198 and end 220 of actuating link 212. One end of link 222 is secured to link 216 at pivot 218 and extends transversely therefrom, as shown in FIG. 7.

Fluid power cylinder 224 is coaxially mounted upon the upper end of member 84 and forms an extension thereof. Fluid power cylinder 224 has a conventional piston 226 therein connected to piston rod 228 which extends vertically downwardly through member 84 and has its lower end 230 extending into cavity 210 of extension portion 194. Link 232 connects end 230 of piston rod 228 to the other end of link 222.

It will now be seen that selective actuation of fluid power cylinder 224 will move piston 226 and piston rod 228 vertically upwardly in the direction shown by the arrow 234, (shown in FIG. 7), will through the linkage connected to the piston rod 228, move sleeve 190 and neck ring holder 186 outwardly, as shown by the arrow 236 to the positions shown in dashed lines, and will further move sleeve 188 and neck ring holder 184 inwardly in the direction shown by the arrow 238 to the positions also shown in dashed lines, thereby opening or separating the neck ring holders 184, 186. It will be readily understood that selective actuation of fluid power cylinder 224 to move piston 226 and piston rod 228 in the direction opposite from that shown by the arrow 234 will return sleeves 188, 190 and neck ring holders 184, 186 to the closed positions as shown in solid lines in FIGS. 6 and 7.

Referring now to FIGS. 8 and 9, it will be seen that guide rails 42, 44 support an anvil carriage 240 for reciprocation relative to parison mold yoke carriage 34 in the line of movement of the latter. Carriage 240 is centrally cut away as at 243 to define separated anvil surfaces 244 and 245. When yoke carriage 34 is so positioned that parison mold 26 registers with parison forming plunger 68, carriage 240 will be advanced to its position as viewed in FIG. 9, whereby anvil surfaces 244, 245 will underlie the lower ends of guide rods 38, 40 to provide solid support for the yoke 25 and parison mold 26. Carriage 240 may preferably be shifted by means of a reciprocating fluid motor 251 whose piston rod 250 is connected to one end of a lever 247, mounted on a stationary pivot 248 intermediate its ends, the opposite end of said lever being operatively received in a suitably flared socket 246 in the carriage 240.

Figure 12:
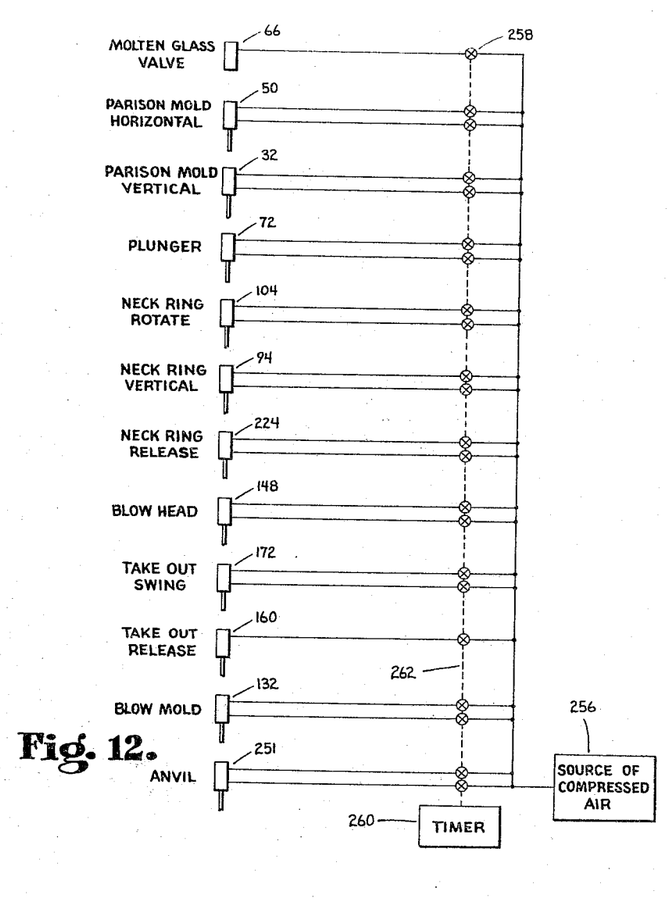
FIG. 12 schematically illustrates the timing and actuating system of the apparatus of the invention.

Referring now briefly to FIG. 12, each of the fluid power cylinders and devices is connected by means of suitable fluid conduits to a source 256 of actuating fluid under pressure. In the preferred embodiment of the invention, the fluid power cylinders and devices are preferably pneumatically operated, the fluid conduits are located internally of the apparatus and source 256 will be a conventional suorce of compressed air. For this reason the fluid conduits are not shown in the drawings. Conventional control valves 258 are located in the fluid conduits coupling the source 256 to the fluid power cylinders and devices and are actuated in the proper sequence, to be hereinafter more fully described, thereby to actuate the fluid power cylinders and devices to perform the requisite motions and transfers, by a conventional timing device 260 suitably coupled to the valves 258 as indicated by the dashed line 262. It will be readily understood that valves 258 may be of the cam-actuated variety, in which case coupling 262 may take the form of a cam shaft driven by timer 260 and having suitable actuating cams secured thereto. On the other hand, valves 258 may be of the solenoid-actuated variety, in which case timer 260 will take the form of a conventional electrical programming device.

Referring now particularly to FIGURES 13A to 13H and 14A to 14F, with parison mold 26 initially positioned in its lower loading position as shown in FIG. 1, molten glass valve 66 is actuated to meter the desired charge 58 of molten glass and to deposit the same by molten glass conduit 60 into the parison mold cavity 28, as suggested in FIG. 13A. Parison mold 26 with the charge 58 of molten glass in parison mold cavity 28 is then moved horizontally by fluid power cylinder 50 in the direction shown by the arrow 264 to its second position as shown in FIG. 2. At this point, neck ring 82, with its two holders 184, 186 already closed, has been moved to its first position concentric with axis 59. Fluid power cylinder 32 is then actuated to elevate parison mold 26 with molten glass charge 58 in parison mold cavity 28 vertically upwardly on axis 59, as shown by the arrow 266 into cooperative association with neck ring 82, as shown in FIG. 13B. Slightly after actuation of fluid power cylinder 32 to initiate elevation of parison mold 26, fluid power cylinder 72 is actuated to move parison forming plunger 68 downwardly on axis 59 in the direction shown by the arrow 268. As soon as parison mold 26 is fully elevated to its pressing position in contact with neck ring 82, fluid power cylinder 251 is actuated to slide carriage 240 beneath yoke 25 with anvil surfaces 244, 245 in supporting relation with the lower ends 252, 254 of guide rods 38, 40 thereby to lock parison mold 26 in its elevated position. Plunger 68 enters the parison mold cavity 28 through neck ring 82 as soon as the parison mold 26 is locked in its elevated pressing position. Parison forming plunger 68 in cooperation with parison mold 26 forms charge 58 of molten glass in the parison mold cavity 28 into parison 182, as shown in FIGS. 13B and C. An annular member 270 surrounds the upper portion of parison-forming plunger 68 and enters recess 272 in neck ring 82 thereby cooperating with the neck ring to form the neck portion 178 of the ultimate glassware. Neck ring 82 may have suitable thread forming grooves 274 formed therein to form cap-securing threads on neck 178 in accordance with conventional practice.

Following the pressing operation during which parison mold 26 and plunger 68 are respectively in the positions shown in FIG. 13C, fluid power cylinder 72 is actuated to retract parison-forming plunger 68 vertically in the direction shown by the arrow 276 to its inactive position, fluid power cylinder 251 is actuated to retract anvil carriage 240, and fluid power cylinders 32, 50 are sequentially actuated to retract parison mold 26 to its second position, as shown by the arrow 278 and then to move parison mold 26 horizontally back to its loading position, as shown by the arrow 280 in FIG. 13D. While parison mold 26 and parison-forming plunger 68 are being returned to their loading and inactive positions respectively, as above-described, neck ring 82 is moved horizontally from its first position concentric with axis 59 with the parison 182 suspended therefrom to its second position concentric with axis 117 of blow mold 116 as indicated by arrow 282 in FIGS. 13D and 13E. During this above-mentioned movement, parison 182 is reheated to a sufficient extent that the subsequent blow molding operation can be accomplished as desired. This movement of neck ring 82 and simultaneous reheat of parison 182 is accomplished by a selective energization of rotary fluid power actuator 104 thereby to rotate neck ring 82 from its first position to its second position at a speed such that parison 182 may sufficiently reheat en route. Immediately following transfer of neck ring 82 to its second position with parison 182 suspended therefrom, fluid power cylinder 94 is actuated to lower neck ring 82 and parison 182 vertically on axis 117 to a position having neck ring 82 adjacent blow mold 116 and having a large portion of parison 182 extending into the cavity 118 of closed blow mold 116. Parison 182 is thereupon finally deposited into blow mold 116 by actuating fluid power cylinder 224 so as to move piston 226 and piston rod 228 downwardly thereby to move neck ring holders 184, 186 apart by means of links 212, 216, 222 and 232. In the preferred embodiment, neck ring 82 is spaced apart from blow mold 116 approximately one-sixteenth inch when neck ring holders 184, 186 are separated thereby to drop parison 182 into blow mold cavity 118 ensuring that only neck 178 will be exterior to blow mold 116 and the remaining portion of parison 182 will be within blow mold cavity 118. Upon separation of neck ring holders 184, 186 fluid power cylinder 94 and rotary power actuator 104 are sequentially actuated to raise neck ring 82 vertically to its second position, as shown by arrow 286, and then to rotate neck ring 82 back to its first position as shown by arrow 288, in FIG. 13F. Fluid power cylinder 224 is again actuated to close neck ring parts 184, 186 during the above described sequential transfer of neck ring 82 from its third to its first position.

As soon as the neck ring 82 clears the upper surface of blow mold 116 in its upward movement toward its second position in the direction shown by the arrow 286, fluid power cylinder 148 is actuated to lower and rotate blowing head 144 to its blowing position, enveloping the open upper end of the parison and establishing communication between the blowing medium source and the interior of the parison 182, as shown in FIG. 13G.

As soon as blowing head 144 is positioned over blow mold 116 and parison 182, blowing medium is introduced therein thereby to blow mold the glassware in the blow mold cavity 118 in conventional fashion. Immediately following the blowing step, fluid power cylinder 148 is again actuated to raise and turn blowing head 144 from its blowing position as shown in FIGS. 2 and 13G to its inactive position and the blow mold 116 is opened to release the completed glassware 180 which is meantime supported by conventional bottom section 290. Fluid power cylinder 172 is now actuated to rotate take-out device 160 from its inactive position to its take out position and the take-out device 160 is in turn actuated to cause jaws 176 to grip neck 178 of the glassware 180. Fluid power device 172 is then again actuated to rotate the take-out device 160 back to its unloading position thereby removing the completed glassware 180 from the bottom section 290 as shown by the arrow 292 in FIG. 13H, and positioning the same immediately above the unloading station 158 as shown in FIG. 4. Take-out device 160 is then again actuated to cause the fingers 176 to release the neck 178 of the completed glassware 180 so as to deposit the same upon the unloading station 158.

Referring particularly to FIGURES 14A to 14F, in accordance with an important aspect of this invention, parison mold 26, following the parison-pressing operation, is returned to its loading position while the neck ring 82 is being rotated from its first position to its second position. The next charge 58 is dropped into parison mold cavity 28 when neck ring 82 is fully closed and approximately in its first position on axis 59, thereby to permit new charge 58 to be pressed immediately after loading.

It will thus be seen that the component devices of the apparatus of the invention are actuated in a number of independent cycles. Thus, a first cycle of operations is provided in which the charge 58 of molten glass is introduced into the upwardly facing cavity 28 of the parison mold 26 in its loading position, the parison mold is sequentially moved horizontally and vertically to its pressing position in cooperative association with the closed neck ring 82 in its first position, the parison-forming plunger 68 is moved vertically downwardly from its inactive position into its pressing position extending through the neck ring into the parison mold cavity 28 thereby to form the charge 58 of molten glass therein to the parison 182, and the plunger 68 and parison mold 26 are then returned to their inactive and unloading positions respectively.

A second cycle of operations is provided in which neck ring 82 is moved from its first position to its second position, during which parison 182 is reheated. Neck ring 82 with parison 182 suspended therefrom, upon reaching the second position of neck ring 82 in registry with the upwardly facing cavity 118 of blow mold 116, is moved vertically downwardly to its third position in which neck ring 82 is opened thereby to deposit parison 182 within the blow mold cavity 118 as above described. Thereafter neck ring 82 is closed and returned to its first position, the next successive first cycle being initiated when neck ring 82 is substantially in its first or pressing position.

Finally, a third cycle of operations is provided in which the neck ring 82, in its third position, deposits the reheated parison 182 in the closed blow mold 116 and then moves toward its first position, the blowing head 144 envelops the open end of the parison, a blowing medium is introduced into the blow mold cavity during movement of the neck ring toward its first position, the blow mold is opened, and the completed glassware 180 is removed therefrom.

More particularly, it will be seen that the charge 58 of molten glass is loaded into the cavity 28 of the parison mold 26 in its first or loading position during a first interval and that the parison mold 26 is moved horizontally to its second position and vertically upwardly to its pressing position in engagement with the closed neck ring 82 in its first position during a second interval, the parison-forming plunger 68 being moved vertically downwardly during the second interval into its pressing position extending through the neck ring 82 and into the parison mold cavity 28. Parison mold 26, plunger 68 and the closed neck ring 82 are then held in their pressing positions for a third interval thereby to form the charge 58 of molten glass in the parison mold cavity 28 into the parison 182. The parison mold 26 is then returned sequentially to its second and loading positions and the plunger is returned to its inactive position during a fourth interval.

The closed neck ring 82 is moved horizontally from its first or pressing position to its second position and then vertically downwardly to its third position with parison 182 suspended therefrom during a fifth interval which is simultaneous to a part of the fourth interval. During this interval, the parison is reheated.

The neck ring 82 is then opened thereby to release the parison 182 into the closed blow mold 116 during a sixth interval.

The neck ring is then returned sequentially through its second position to its first or pressing position and closed during a seventh interval which ends substantially as the first interval begins. The blow mold 116 is closed and maintained closed during an eighth interval which begins at least before the sixth interval and is simultaneous to at least a part of the seventh interval.

The blowing head 144 is moved from its inactive position to its position (FIG. 13G) enveloping the open upper end of the parison and blowing medium is introduced into the blow mold cavity through the blowing head 144 thereby to blow mold the parison 182 therein during an eleventh interval which includes at least a part of the ninth interval; and the blowing head 144 is returned to its inactive position during a twelfth interval which includes at least a part of the tenth interval. Finally, the completed glassware 180 is removed from the blow mold cavity 118 during the twelfth interval.

The invention provides a versatile apparatus by which wide-mouth glassware ranging in size from a gallon container to a four ounce container can be produced in shorter time than that possible on conventional machinery.

To accomplish this versatility, four provisions are made in the apparatus hereinbefore described. First, a variety of parison molds 26 is provided, each having a parison mold cavity 28 corresponding to a different sized container that is desirably made on the apparatus of the invention. To provide that the bottom of parison mold cavity 28 of each parison mold 26 achieves a predetermined height when parison mold 26 is fully extended along axis 59 in its second position, a series of stools 27 is provided each of which corresponds to a specific parison mold 26 with which it will be exclusively used. A second provision is made for varying the stroke of power cylinder 72 and the mounting position thereof so as to selectively vary both the at rest position and the fully extended position of parison-forming plunger 68. The position of fluid power cylinder 72 is vertically adjusted by providing a series of riser blocks 294 each of which, like the series of stools 27, corresponds to a specific parison mold 26 with which it will be exclusively used. A selected riser block 294 is inserted between fluid power cylinder 72 and plate member 74 to selectively establish an elevation of fluid power cylinder 72 in relation to the plate 74, thereby determining the elevation of the fully extended position of parison-forming plunger 68. The at rest position of parison-forming plunger 68 is selectively changed by means of an adjustment upon fluid power cylinder 72 which effectively varies the stroke or piston travel thereof. It can be seen in FIGS. 2 and 3 that the effect of decreasing the thickness of riser block 294 is to lower the fully extended position of parison-forming plunger 68. Therefore, it will be seen that, when a parison mold of any specific size is to be used, a specific riser block 294 and a specific stool 27 must be used therewith, said block and stool being so related in height that, when the yoke 25 is fully raised and the plunger 68 is fully extended, the plunger and parison mold will properly cooperate to form a parison 182 of desired thickness. As the parison mold 26 must always be fully extended in its position two and locked in place by anvil carriage 240 before parison-forming plunger 68 is moved downwardly, the provision of shortening the stroke of power cylinder 72 saves valuable production time and permits small sized containers to be produced at a faster rate than the larger sized containers. A third provision is made to shorten the stroke of fluid power cylinder 94 to such a degree that the highest elevation that neck ring 82 may attain corresponds to the newly adjusted elevation that the topmost surface of the parison mold 26 attains when yoke 25 is fully extended in its position two. No provision is made to adjust the fully extended position of fluid power cylinder 94 as the series of blow molds 116 that correspond to the various sizes of containers being made are of substantially identical exterior size and mounted in substantially the same position. By maintaining this constancy in the blow molds 116, likewise no provision need be made to modify the take-out device 160 or its actuating mechanism.

In the preferred embodiment of the invention, the time saved by shortening the stroke of fluid power cylinders 94 and 72 to the extent desirable in manufacturing a four ounce container shortens the total cycle time approximately ten percent and increases the production rate a similar amount.

The production rate of the apparatus of the invention can be further increased when the apparatus is used to produce a wide range of different sized containers by converting the hereinabove described single gob machine to double gob operation. This conversion is made in a manner similar to the conventional manner of similarly converting conventional machinery as the hereinabove described apparatus uses conventional mold equipment.

The conversion of the hereinabove described machinery is achieved by simply substituting for the single parison mold 26, the single parison-forming plunger 68, the single fluid power cylinder 72 and its means of connection to parison forming plunger 68, the single neck ring 82, the single blow mold 116, and the single take-out device 160 (all shown in FIGS. 1 through 4) a pair of the same. Each pair of identical items are mounted in horizontal, spaced-apart relationship but otherwise identical relative position to that shown in the figures. Each of the pairs, excepting the pair of parison-forming plungers 68, are actuated by the single actuating device shown in the figures to actuate the corresponding single item. Further each item of the pairs performs identically to the single item at a position horizontally spaced therefrom.

It can easily be seen that by this conversion to double gob operation, two containers may be made simultaneously and that the production rate is doubled. The double gob apparatus of this invention further possesses all of the advantages herein mentioned in reference to the single gob apparatus over conventional double gob machinery. Still further, the simplified apparatus of the invention has the capability of positioning the pair of identical items at a larger spaced-apart distance than heretofore possible. As this spaced-apart distance is the factor that limits the size of container that can be made on a double gob machine, the double gob apparatus of the invention can produce containers of larger size than heretofore possible.

It will be seen that the invention provides improved apparatus for the production of wide-mouth glassware which permits increases in the production speed of existing glass forming machinery and which further incorporates simplified straight line motions and actuating mechanisms. The increase in production speed is provided in part by the employment of a solid parison mold having an upwardly facing mold cavity which is top loaded by conventional molten glass loading devices. The parison mold is positioned and transferred between its loading and pressing positions without regard to the cycle or position of the blow mold and accompanying blowing and take-out devices. Thus, the parison mold is transferred during normal "dead time" of the blow mold which permits a short time cycle for transfer of the parison to the blow mold.

The increase in production speed is further accomplished by programming the reheat cycle to occur during the transfer of the parison to the blow mold, in contrast with prior apparatus in which reheating of the parison was accomplished in the blow mold. This permits an increased number of blowing cycles for any given period of operation as reheating is accomplished completely exterior to the blow mold and independent thereof. Thus, in contrast with conventional glass-blowing apparatus in which the pacing cycle is the time required to insert the parison in the blow mold, reheat the parison, blow, plus opening and closing of the blow mold and transfer of the parison thereto, the apparatus and method of the invention deletes that portion of the time previously required for reheating of the parison in the blow mold which in many cases exceeded the total of all of the other cycles hereinbefore described, thereby substantially reducing the time in which the parison is in the blow mold and the total production time for each bottle produced.

It will further be seen that the apparatus and method of the invention permits the parison mold to be returned to its loading position, to receive the next successive charge of molten glass, and to be transferred to its pressing position in a cycle which more efficiently overlaps the blow mold cycle, this increase in efficiency being rendered possible by the employment of a neck ring mechanism which is free to travel through a portion of its cycle without interfering with the movement and cycling of either the parison mold or the blow mold. Thus, it is seen that the parison mold, neck ring mechanism and blow mold are each operated in independent cycles and each during a part of its cycle, is free to operate without regard to the position of the other elements in their respective cycles, thereby further reducing the production time for each bottle produced.

It will still further be seen that the improved apparatus and method of the invention permits the production of an improved container of less material. This is achieved primarily by two changes in the conventional method of making glassware in conventional machinery. The upright solid or single piece parison mold permits a container to be made without seams thereby completely eliminating a source of imperfections that heretofore was responsible for a major portion of rejected and unusable containers made on conventional machinery. Secondly, by the elimination of several operations from the sequence of operations mandatory in conventional machinery, the transfer of the parison from the pressing position to the blow mold can be achieved at a slower rate than heretofore possible without lengthening total cycle time. This slower transfer rate makes possible the production of glassware having an improved uniformity in wall thickness, as the conventional transfer rate had the effect of deforming the parison, which is relatively soft and plastic during transfer, to the extent of thinning the leading wall thickness and thickening the trailing wall thickness.

The use of an upright parison in the apparatus of the invention permits a further improvement in the quality of the container produced. This further improvement is derived from the fact that nowhere in the production cycle of the invention is the parison in an inverted position. In such a position a relatively soft parison with a substantial amount of material at its apex will deform merely upon being unsupported in an inverted position, and will further deform upon inversion, since any inversion, no matter how slow, sets up centrifugal and gravitational forces that cannot be structurally borne by the parison. To minimize the amount of rejected and unusable containers resulting from blow molding eccentric parisons and parisons having seams a larger gob or charge of glass is used conventionally to compensate for variations in wall thickness which inevitably arise because of the types of movements to which the parison is necessarily subjected in such previously known machines. By blow molding a relatively concentric parison as is made possible by the invention, a smaller gob or charge may be used thereby resulting in a substantial saving of material.

In the preferred embodiment of the invention the saving of material by blow molding a concentric parison is approximately ten percent of the material used by conventional machinery.

It will be seen that the improved apparatus of the invention employs many conventional components and standard hardware devices which are common to existing glass blowing equipment and that the straight line motions and the ready accessibility of the actuating and transfer mechanisms simply set up, adjustment and maintenance of the apparatus. Importantly, it will be observed that the apparatus of the invention is entirely mounted and supported upon the box frame 22 which permits its installation in existing glass blowing machinery utilizing existing loading and unloading positions.

In addition to the increase in production speed realized by the apparatus of the invention, by virtue of the provision of the reheat cycle external to the blow mold, it is now possible to observe the parison during its reheating cycle and to apply, if desired, additional processes for surface coating and selective cooling prior to the positioning of the parison in the blow mold.

While I have illustrated and described a specific embodiment of this invetion, further modifications and improvements will occur to those skilled in the art and I desire therefore, in the appended claims, to cover all modifications which do not depart from the spirit and scope of this invention.

I claim as my invention:

1. Apparatus for forming hollow glassware comprising a charging station, a pressing station and a blowing station, a blow mold having an upwardly opening mouth at said blowing station, a press plunger at said pressing station, a first motor means for reciprocating said plunger upon a substantially vertical axis between a lower limiting position above the level of said blow mold and an upper limiting position at a still higher level, a solid parison mold having an upwardly opening mouth, second motor means for reciprocating said parison mold between said charging station and said pressing station, fluid motor means for elevating said parison mold, when at said pressing station, into cooperative association with said plunger means, and anvil means cooperative with said parison mold only after said parison mold has been so elevated at said pressing station to support said parison mold independently of said fluid motor means.

2. The apparatus of claim 1 including a split neck ring, means for moving said neck ring substantially horizontally between said pressing station and said blowing station, other means for moving said neck ring substantially vertically between a level substantially coincident with the mouth of said parison mold in the elevated position of said parison mold and a level substantially coincident with the mouth of said blow mold, and means for opening and closing said neck ring.

3. The apparatus of claim 2 in which said neck ring comprises two identical pieces allochirally arranged, said means for opening and closing said neck ring comprises a guide rod, two slides reciprocably mounted on said guide rod and respectively carrying said neck ring pieces, a lever centrally pivoted upon an axis transverse relative to the length of said guide rod adjacent one end of said guide rod, a first link pivotally connected to one arm of said lever and to one of said slides, an actuating rod connected to the other of said slides, a second link pivotally connected to the other arm of said lever and to said actuating rod, and motor means connected to rock said lever.

4. The apparatus of claim 3 including a vertical member rigidly supporting said guide rod, means mounting said vertical member for reciprocation and oscillation upon a substantially vertical axis, said means for moving said neck ring substantially horizontally comprising an oscillatory motor having a crank, a bushing having a splined connection with said vertical member and having a crank, and link means providing an operative connection between said motor crank and said bushing crank, and said means for moving said neck ring substantially vertically comprising a reciprocating motor having a piston rod, a bracket fixed to said rod, and a bearing fixed against reciprocation relative to said vertical member and engaging said bracket to provide a driving, swivelled connection between said piston rod and said vertical member.

5. In apparatus for forming hollow glassware, the improvement which comprises a pair of vertically aligned bearings (86, 88), a member (84) supported in said bearings for reciprocation and oscillation upon the common axis of said bearings, a third bearing (102) axially fixed to said member at a point between said aligned bearings, a first motor (94) mounted adjacent said member and including a reciprocator (98) arranged for vertical reciprocation, a bracket (100) fixedly extending laterally from said reciprocator and operatively engaged with said third bearing to provide an axial driving connection between said reciprocator and said member, said member being free to turn upon its own axis relative to said reciprocator, a bushing (90) mounted below said aligned bearings and held against axial movement but free to turn about said axis, said bushing having a splined connection (92) with said member, an oscillating motor (104) mounted adjacent said member, means (106, 110, 112, 114) providing a driving connection between said oscillating motor and said bushing, a lateral extension (194) at the lower end of said member, and a neck ring (82) carried by said extension.

6. The improvement of claim 5 in which said member and said extension are hollow, a guide rod supported from said extension, two slides reciprocably mounted on said guide rod, said neck ring comprising two identical pieces allochirally arranged and respectively carried by said slides, a lever centrally pivoted within said member upon an axis transverse relative to the length of said guide rod adjacent one end of said guide rod, a first link pivotally connected to one arm of said lever and to one of said slides, an actuating rod connected to the other of said slides, a second link pivotally connected to the other arm of said lever and to said actuating rod, and motor means carried by said member and connected to rock said lever.

7. The improvement of claim 6 in which said last-named motor means comprises a fluid cylinder formed at the upper end of said member, a piston reciprocable in said cylinder, a piston rod reciprocable within said member, a second lever fixed relative to said first-named lever, and a link pivoted to the lower end of said piston rod and to said second lever.

References Cited

UNITED STATES PATENTS

| 679,664 | 7/1901 | Blue | 65—229 |
| 687,595 | 11/1901 | Blue | 65—229 |
| 1,601,836 | 10/1926 | Stenhouse | 65—231 |
| 2,011,187 | 8/1935 | Rowe | 65—237 |
| 2,357,501 | 9/1944 | Carnahan | 65—238 |
| 2,864,124 | 12/1958 | Strauss | 65—229 X |
| 3,169,846 | 2/1965 | Zappia | 65—241 X |

DONALL H. SYLVESTER, *Primary Examiner.*

F. W. MIGA, *Assistant Examiner.*